United States Patent
Tang et al.

(10) Patent No.: US 11,185,022 B2
(45) Date of Patent: Nov. 30, 2021

(54) SPRINKLER CART OF HOSE REEL IRRIGATOR IN FOLDING TRUSS INHAUL-CABLE TYPE

(71) Applicant: JIANGSU UNIVERSITY, Jiangsu (CN)

(72) Inventors: Lingdi Tang, Jiangsu (CN); Cong Yu, Jiangsu (CN); Shouqi Yuan, Jiangsu (CN); Yue Tang, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 245 days.

(21) Appl. No.: 16/476,422

(22) PCT Filed: Mar. 30, 2018

(86) PCT No.: PCT/CN2018/081221
§ 371 (c)(1),
(2) Date: Jul. 8, 2019

(87) PCT Pub. No.: WO2019/178889
PCT Pub. Date: Sep. 26, 2019

(65) Prior Publication Data
US 2021/0176929 A1    Jun. 17, 2021

(30) Foreign Application Priority Data
Mar. 23, 2018 (CN) .......................... 201810246802.9

(51) Int. Cl.
*A01G 25/09*    (2006.01)

(52) U.S. Cl.
CPC .................................. *A01G 25/095* (2013.01)

(58) Field of Classification Search
CPC ...... A01G 25/00; A01G 25/09; A01G 25/095; A01G 25/097; A01G 25/092; A01C 21/00; B05B 9/06
See application file for complete search history.

(56) References Cited

U.S. PATENT DOCUMENTS

| | | | |
|---|---|---|---|
| 4,384,676 A * | 5/1983 | Zimmerer | A01G 25/097 239/724 |
| 4,412,655 A * | 11/1983 | Noble | A01G 25/097 239/740 |
| 2004/0016833 A1 | 1/2004 | Daniel | |
| 2014/0183287 A1* | 7/2014 | Korus | A01G 25/095 239/723 |
| 2017/0086399 A1* | 3/2017 | Anderson | A01G 9/02 |
| 2018/0325048 A1* | 11/2018 | Miller | A01B 69/008 |

FOREIGN PATENT DOCUMENTS

| | | |
|---|---|---|
| CN | 201388427 Y | 1/2010 |
| CN | 202842028 U | 4/2013 |
| EP | 1545791 A1 | 6/2005 |
| GB | 727830 A | 4/1955 |

* cited by examiner

*Primary Examiner* — Qingzhang Zhou
*Assistant Examiner* — Joel Zhou
(74) *Attorney, Agent, or Firm* — Marshall, Gerstein & Borun LLP

(57) ABSTRACT

A sprinkler cart of hose reel irrigator in folding truss inhaul-cable type includes a cart body, a water supply pipeline, a folding truss structure and an inhaul-cable structure. The folding truss structure adopts a planar multi-rod folding structure, drives a three-rod folding through a single hydraulic cylinder, and is mounted on the cart body in combination with the inhaul-cable structure.

10 Claims, 6 Drawing Sheets

SPRINKLER CART OF HOSE REEL IRRIGATOR IN FOLDING TRUSS INHAUL-CABLE TYPE

TECHNICAL FIELD

The present invention belongs to the field of agricultural machinery, and relates to an agricultural water-saving irrigation device, in particular to a sprinkler cart of hose reel irrigator in folding truss inhaul-cable type.

BACKGROUND

The hose reel irrigator is one of the most popular irrigation equipment in China. It mainly includes water supply pump, PE reel, PE pipe, reel driving device (such as water turbine or motor), and supporting sprinkler cart. The PE reel is used to unreel the PE pipe, the water supply pump is used to supply pressurized water to the PE pipe, and the pressurized water enters the sprinkler cart through the PE pipe, so that the sprinkler cart can perform the sprinkling irrigation operation while the PE pipe is unreeled.

There are two main types of sprinkler carts used in hose reel irrigators, one is the single-nozzle sprinkler cart, and the other is the multi-nozzle sprinkler cart in truss or spray pipe sling type. The single-nozzle sprinkler cart has large pipeline hydraulic loss, high energy consumption and poor sprinkling irrigation uniformity due to the required high sprinkling irrigation pressure. With regard to the multi-nozzle sprinkler cart, as multiple nozzles operate simultaneously, the required inlet water pressure is low, the energy is low, resulting in low drop height of the water drop, small sprinkling width, and less weather influence, so that the sprinkling irrigation uniformity is greatly improved.

At present, the sprinkler cart in spray pipe sling type relies on manpower to join spray pipes on site by using quick joint. The sling needs to be manually pulled and clamped, and the installation and disassembly processes are cumbersome, labor intensive and inefficient. The disassembled spray pipes need to be transported to a separately configured storage space, resulting in increased cost of transporting and storage.

CONTENTS OF THE INVENTION

In view of the deficiencies in the prior art, the present invention provides a sprinkler cart of hose reel irrigator in folding truss inhaul-cable type, which reduces the labor intensity and improves the mechanical operating level of the hose reel irrigator unit.

The present invention achieves the above technical objects by the following technical means.

A sprinkler cart of hose reel irrigator in folding truss inhaul-cable type comprises a cart body, a water supply pipeline, a folding truss structure and an inhaul-cable structure;

the cart body includes a chassis, an inhaul-cable supporting frame and a truss supporting frame, the inhaul-cable supporting frame comprises a lateral connecting rod and vertical supporting rods; the tops of the two supporting rods are respectively connected to the two ends of the connecting rod, and the bottoms thereof are fixed to the chassis; the bottom of the chassis is provided with a travelling wheel, and both ends of the truss supporting frame are slidably connected with two supporting rods, and the position of the truss supporting frame can be adjusted up and down;

the folding truss structure comprises two folding truss subassemblies of the same structure, and the two folding truss subassemblies are symmetrically distributed on both sides of the inhaul-cable supporting frame;

the folding truss subassembly includes a first truss spray pipe, a second truss spray pipe, a third truss spray pipe, a swinging rod, a first connecting rod, a second connecting rod, a driving plate, a second hydraulic cylinder, and hose joints; the first truss spray pipe, the second truss spray pipe and the third truss spray pipe are connected in turn and rotatable relative to each other; the first truss spray pipe, the second truss spray pipe, and the third truss spray pipe are evenly mounted with nozzles; the second hydraulic cylinder is mounted on the first truss spray pipe and arranged along the axial direction of the first truss spray pipe; the end of the piston rod of the second hydraulic cylinder is hinged with one end of the driving plate, and the other end of the driving plate is hinged with the first connecting rod; one end of the first connecting rod near the driving plate is hinged to the first truss spray pipe, the other end thereof is hinged to one end of the second connecting rod, and the other end of the second connecting rod is welded with the third truss spray pipe, the other end of the first truss spray pipe is communicated with a water supply pipeline provided on the cart body and is connected by a hinge device; one end of the swinging rod is connected to the truss supporting frame by a hinge device, and the other end thereof is connected to the second truss spray pipe by a hinge device;

each of the folding truss subassemblies is corresponding to multiple inhaul-cable structures, the inhaul-cable structure comprises an inhaul-cable, the inhaul-cable is connected to the folding truss subassembly through the inhaul-cable supporting frame, and the inhaul-cables on the two folding truss subassemblies are symmetric about the inhaul-cable supporting frame.

Preferably, one end of the first truss spray pipe is communicated with one end of the second truss spray pipe through a hose joint and is connected by a hinge device; the other end of the second truss spray pipe is communicated with one end of the third truss spray pipe through a hose joint and is connected by a hinge device.

Preferably, one end of the first truss spray pipe is connected to one end of the second truss spray pipe through a rotary joint, and the other end of the second truss spray pipe is connected to one end of the third truss spray pipe through a rotary joint; the rotary joint comprises an upper rotary head with 90° elbow, a bearing end cover, a bearing, an O-shape sealing ring and a lower rotary head with 90° elbow; one end of the upper rotary head is connected with one end of the lower rotary head through the bearing end cover and the bearing, and the O-shape sealing ring is provided at the connection.

Preferably, the chassis has a rectangular structure with opposite first beam and second beam, and the PE connecting pipe is vertically mounted at the bottom of the first beam; the traveling wheel comprises a front wheel and two rear wheels, the front wheel is rotatably mounted on the front end of the PE connecting pipe, and the two rear wheels are respectively mounted on both ends of the second beam by vertical rods and horizontal rods; the rear wheel is rotatably mounted on the bottom of the vertical rod, and the top end of the vertical rod is fixed with the horizontal rod; the horizontal rod is sleeved on the end of the second beam of the chassis, the ends of the horizontal rod and the second beam are provided with corresponding pin holes, and the relative position of the horizontal rod and the second beam is set by pin and pin hole.

Preferably, the water supply pipeline comprises a connecting hose, a flange connecting frame, a vertical water pipe, a retractable water pipe, and a main connecting spray pipe; one end of the connecting hose is connected with the rear end of the PE connecting pipe, the other end thereof is connected with the bottom end of the vertical water pipe; the top end of the vertical water pipe is connected with the bottom end of the retractable water pipe, and the top end of the retractable water pipe is communicated with the middle section of the main connecting spray pipe; the main connecting spray pipe is fixed on the truss supporting frame, and both ends of the main connecting spray pipe are respectively connected with the other ends of the two first truss spray pipes, and the vertical water pipe is mounted on the chassis.

Preferably, the main connecting spray pipe is formed by connecting two same steel pipes on the left and right and a three-way joint.

Preferably, it further comprises a first hydraulic cylinder, the first hydraulic cylinder is vertically arranged below the truss supporting frame, and the piston rod of the first hydraulic cylinder is fixed to the truss supporting frame.

Preferably, the chassis is provided with a third beam and a fourth beam; a flange is welded in the middle of the vertical water pipe and in flanged connection with the flange connecting frame by a bolt, the flange connecting frame is mounted on the third lateral supporting beam of the chassis.

Preferably, the inhaul-cable structure further comprises an inhaul-cable drum, a scroll spring, drum bearings and an inhaul-cable clamping structure; the inhaul-cable drum is mounted on the middle of the drum shaft, one end of the scroll spring is mounted on one side of the drum shaft, and the other end thereof is connected to the chassis; the drum shaft is mounted between the two beams of the chassis by two drum bearings, and the inhaul-cable is wound around the inhaul-cable drum, and one end of the inhaul-cable is connected to the folding truss subassembly through the inhaul-cable clamping structure.

Preferably, the inhaul-cable clamping structure is mounted on a mounting beam, and the mounting beam is mounted on the upper middle of the first beam and the second beam of the chassis; the inhaul-cable clamping structure comprises a fixed clamp block, a sliding clamp block, a clamping cam and a clamping handle; the fixed clamp block is mounted on the mounting beam, the sliding clamp block is mounted on a sliding groove of the fixed clamp block, a through-hole is formed between the sliding clamp block and the fixed clamp block, and the inhaul-cable passes through the through-hole; the clamping cam is coaxially fixed to the cam handle, the cam handle is rotatably connected to the fixed clamp block, and the rotation of the cam handle drives the clamping cam to move, thereby pushing the sliding clamp block to clamp or release the inhaul-cable.

Preferably, each of the folding truss subassemblies corresponds to two inhaul-cable structures; one end of the transverse connecting rod of the inhaul-cable supporting frame is respectively connected to the second truss spray pipe on both sides by two symmetrical inhaul-cables, and the other end of the transverse connecting rod of the inhaul-cable supporting frame is connected to the third truss spray pipe on both sides by two symmetrical inhaul-cables respectively.

The beneficial effects of the present invention:

1) The present invention adopts a folding truss structure, and the spray pipe truss can be folded and placed on the cart body, and unfolded by the hydraulic cylinder during operation. Compared with the existing on-site manually detachable truss sprayer, the manual complex installation operation is liberated, the labor intensity is reduced, the mechanization level of operation is improved, and the efficiency is greatly improved.

2) The present invention adopts a planar multi-rod folding structure to match the inhaul-cable for load-bearing. Compared with the existing space truss folding sprinkling structure, the number of rods is greatly reduced, the consumption of manufacturing material is saved, the weight of the truss structure is reduced, the power for driving the folding operation is also reduced, and the manufacturing and operating costs are reduced.

3) The present invention adopts a solution for directly passing water through the supporting steel pipe truss, the present invention solves the problem that the current steel pipe supporting frame can only provide load-bearing and cannot fold and allow water to pass through, simplifies the structural configuration, and provides a new solution for new sprinkler folding implementation.

4) The present invention drives the three-rod folding structure by a single hydraulic cylinder, breaks the limitation of the traditional folding sprinkling truss that can only realize two-rod folding, and greatly improves the range of sprinkling irrigation.

In the figures,

1. Water supply pipeline, 2. inhaul-cable structure, 3. cart body, 4. folding truss structure, 5. inhaul-cable, 6. front wheel, 7. PE connecting pipe, 8. connection hose, 9. the first hydraulic cylinder, 10. flange connecting frame, 11. vertical water pipe, 12. retractable water pipe, 13. main connection spray pipe, 14. truss supporting frame, 15. inhaul-cable supporting frame, 16. joint connecting column, 17. chassis, 18. rear wheel, 19. linear joint, 20. the second hydraulic cylinder, 21. driving plate, 22. the first truss spray pipe, 23.

T-shaped joint, 24. the first connecting rod, 25. the second truss spray pipe, 26. the second connecting rod, 27. the third truss spray pipe, 28. hose joint, 29. rotary joint, 29-1. upper rotary head, 29-2. bearing end cover, 29-3. bearing, 29-4. O-shape sealing ring, 29-5. lower rotary head, 30. swinging rod, 31. nozzle, 32. scroll spring, 33. inhaul-cable drum, 34. drum bearing, 35. mounting beam, 36. fixed clamp block, 37. sliding clamp block, 38. clamping cam, 39. cam handle, 40. sliding groove.

EMBODIMENTS

Figure 1:
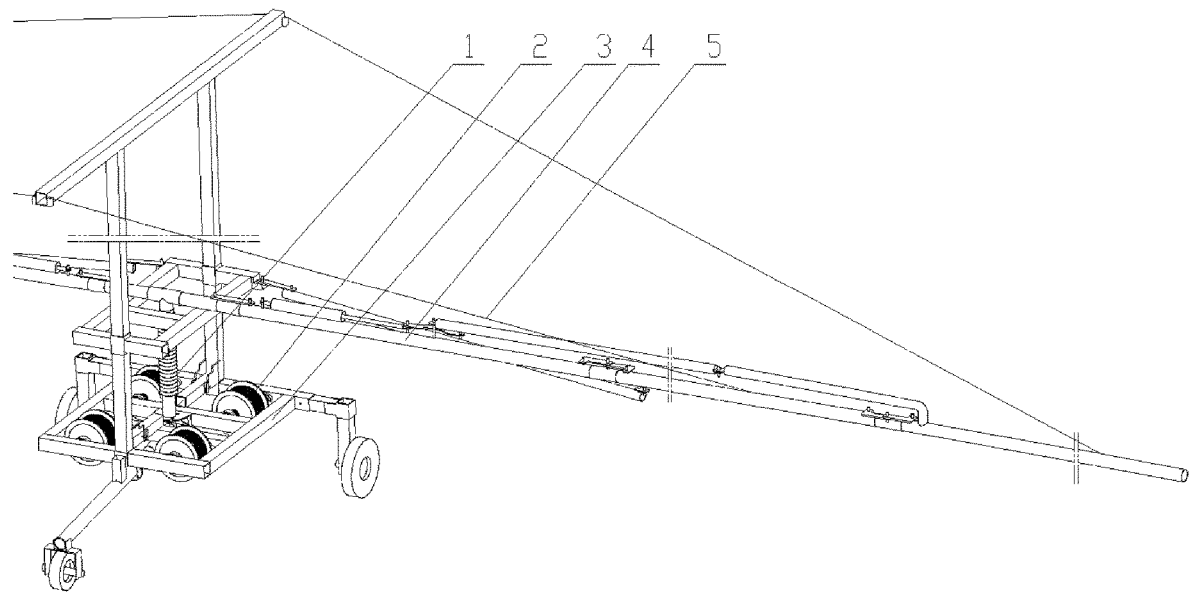
FIG. 1 is a schematic diagram of the sprinkler cart of hose reel irrigator in folding truss inhaul-cable type according to the present invention.
Figure 2:
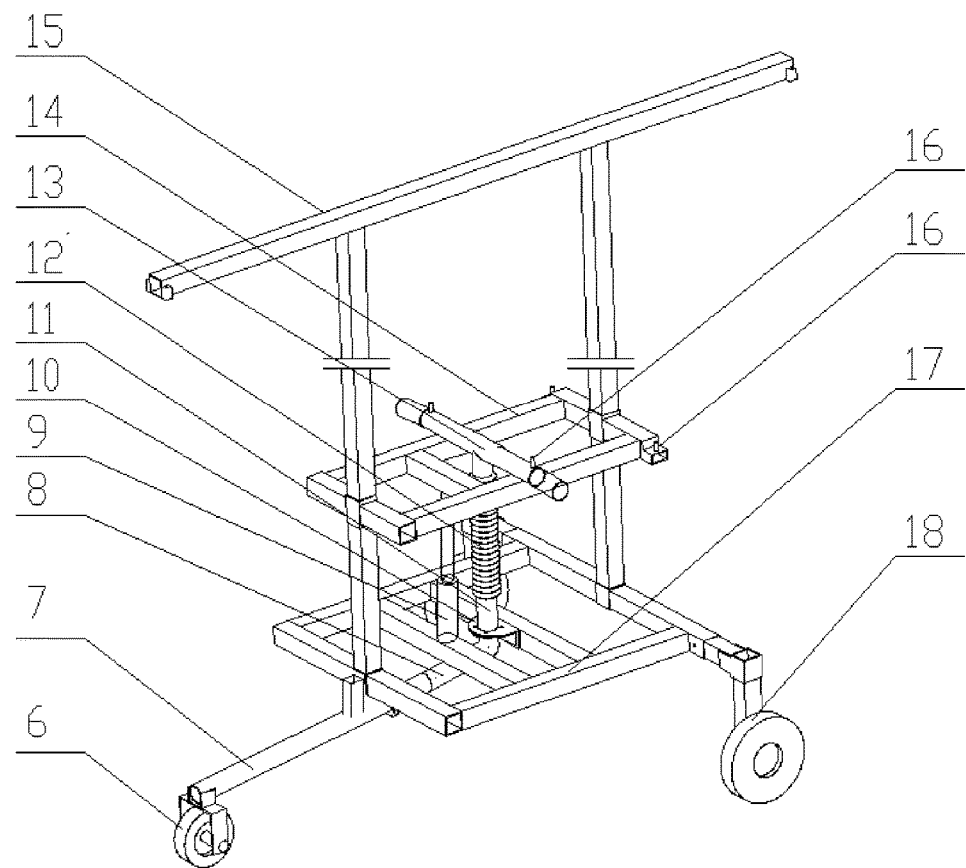
FIG. 2 is a schematic diagram of the cart body and the water supply pipeline according to the present invention.
Figure 3:
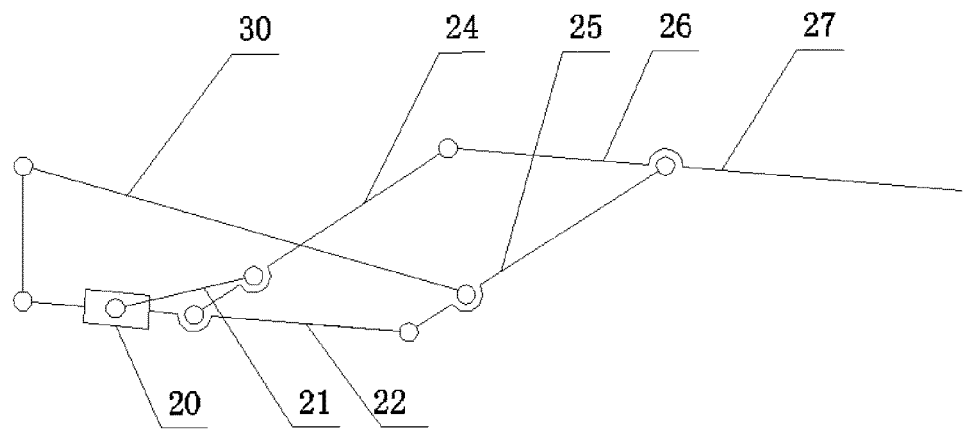
FIG. 3 is a structural mechanism diagram of the hose-connected folding truss subassembly according to the present invention.

The present invention will be further described below according to the drawings and embodiments, but the protection scope of the present invention is not limited thereto. As shown in FIG. 1, the sprinkler cart of hose reel irrigator in folding truss inhaul-cable type according to the present invention comprises a cart body, a water supply pipeline, a folding truss structure and an inhaul-cable structure. As shown in FIG. 2, the cart body comprises a chassis 17, an inhaul-cable supporting frame 15 and a truss supporting frame 14, the chassis 17 has a rectangular structure with the opposite first beam and second beam, and the PE connecting pipe 7 is vertically installed at the bottom of the first beam. A traveling wheel is mounted below the chassis 17, the traveling wheel comprises a front wheel 6 and two rear wheels 18, the front wheel 6 is rotatably mounted on the front end of the PE connecting pipe 7, and the two rear wheels 18 are respectively mounted on both ends of the second beam by vertical rods and horizontal rods. The rear wheel 18 is rotatably mounted on the bottom of the vertical rod, and the top end of the vertical rod is fixedly connected with the horizontal rod. The horizontal rod is sleeved on the end of the second beam, the ends of the horizontal rod and the second beam are provided with corresponding pin holes, and the relative positions of the horizontal rod and the second cross beam are set by a pin and the pin hole, so as to adjust the wheelspan of the two rear wheels 18.

The inhaul-cable supporting frame 15 comprises a lateral connecting rod and a vertical supporting rod. The tops of the two supporting rods are respectively connected to both ends of the connecting rod in symmetrical position, and the bottoms thereof are respectively fixed on the first beam and the second beam. The truss supporting frame 14 is composed of three cross rods and two longitudinal rods, the first cross rod and the third cross rod are slidably mounted on the inhaul-cable supporting frame 15. The chassis 17 is further provided with a third beam and a fourth beam. The first hydraulic cylinder 9 is vertically mounted on the third beam, and the piston rod of the first hydraulic cylinder 9 is fixedly connected with the truss supporting frame 14. The mounting height of the truss supporting frame 14 is changed by the first hydraulic cylinder 9, and a connecting column is mounted on the upper side of the end of the third cross rod of the truss supporting frame 14, to provide a joint connecting column 16 for the folding truss structure. The water supply pipeline comprises a connecting hose 8, a flange connecting frame 10, a vertical water pipe 11, a retractable water pipe 12, and a main connecting spray pipe 13. One end of the connecting hose 8 is connected with the rear end of the PE connecting pipe 7, the other end thereof is connected with the bottom end of the vertical water pipe 11. The top end of the vertical water pipe 11 is connected with the bottom end of the retractable water pipe 12. A ring flange is welded in the middle of the vertical water pipe 11 and flangedly connected with the flange connecting frame 10 by a bolt. The flange connecting frame 10 is mounted on the third beam of the chassis 17. The top end of the retractable water pipe 12 is connected with the middle section of the main connection spray pipe 13, and the main connection spray pipe 13 is fixed on the two longitudinal rods of the truss supporting frame 14. Joint connecting columns are provided on the upper side of the left and right ends of the main connection spray pipe 13, to provide joint connecting column 16 for the folding truss structure.

Figure 4:
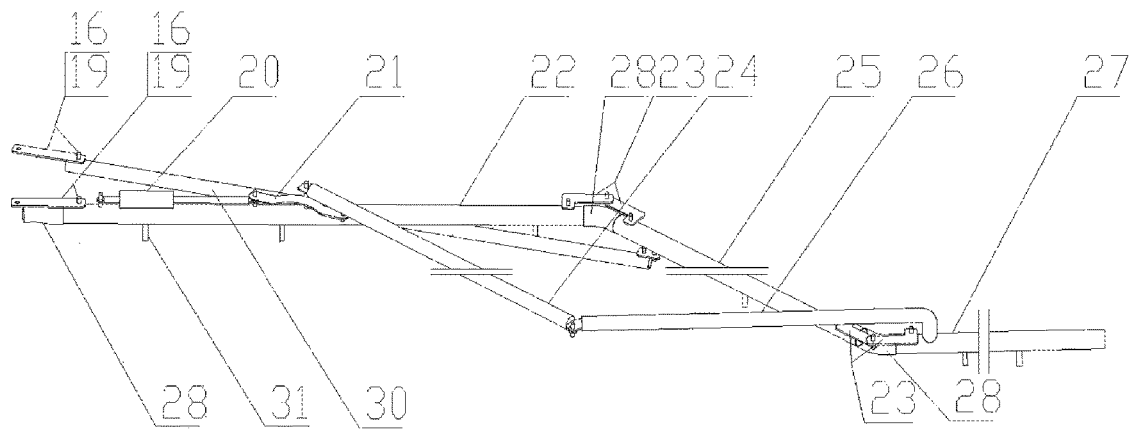
FIG. 4 is an isometric view of the hose-connected folding truss subassembly according to the present invention.
Figure 5:
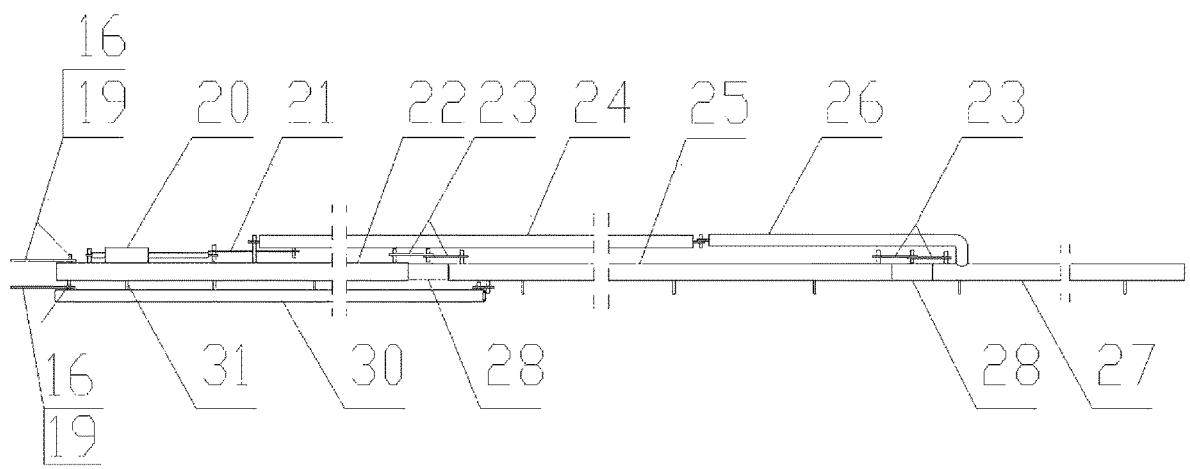
FIG. 5 is a front view of the hose-connected folding truss subassembly according to the present invention.
Figure 6:
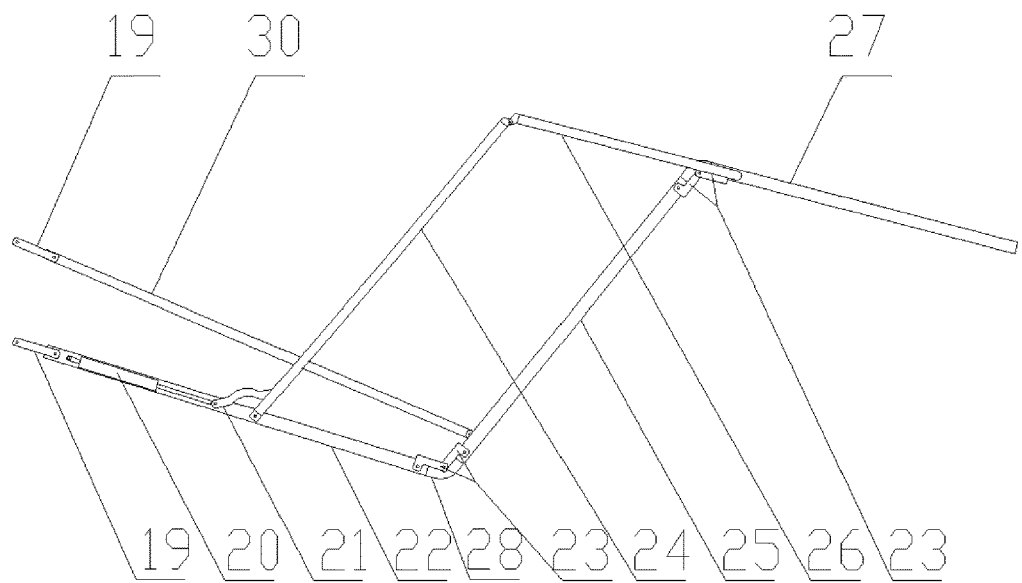
FIG. 6 is a top view of the hose-connected folding truss subassembly according to the present invention.

The folding truss structure comprises two folding truss subassemblies of the same structure, and the two folding truss subassemblies are symmetrically distributed on both sides of the inhaul-cable supporting frame 15. As shown in FIG. 4, the folding truss subassembly includes a first truss spray pipe 22, a second truss spray pipe 25, a third truss spray pipe 27, a swinging rod 30, a first connecting rod 24, a second connecting rod 26, a driving plate 21, a second hydraulic cylinder 20, and a hose joint 28. The first truss spray pipe 22, the second truss spray pipe 25, and the third truss spray pipe 27 are sequentially connected by hose joints 28, so that sprinkling water is introduced from the water supply pipeline into each truss spray pipe. The first truss spray pipe 22, the second truss spray pipe 25, the third truss spray pipe 27, and the swinging rod 30 are all provided with joint columns 16. The first truss spray pipe 22 is provided with a long linear joint 19 at one end and a T-shaped joint 23 at the other end. Both ends of the second truss spray pipe 25 and the third truss spray pipe 27 are provided with T-shaped joints 23. The swinging rod 30 is provided with a long linear joint 19 at one end and a short linear joint 19 at the other end. The cylindrical hole on the long linear joint 19, the short linear joint 19 and the T-shaped joint 23 are fixed to the corresponding joint connecting columns 16 by welding. By joint connection, the coupling stiffness between the truss spray pipes is improved, the rotation between the truss spray pipes and the folding can be realized, and the T-shaped joint can realize the rotation and folding between the truss spray pipes without interference. The long linear joint 19 at one end of the first truss spray pipe 22 is rotatably connected to the joint connecting column 16 on the main connecting spray pipe 13, and the T-shaped joint 23 at the other end of the first truss spray pipe 22 is rotatably connected to the T-shaped joint 23 at one end of the second truss spray pipe 25. The T-shaped joint 23 at the other end of the second truss spray pipe 25 is rotatably connected to the T-shaped joint 23 on the third truss spray pipe 27. The upper side of the end of the T-shaped joint of the third truss spray pipe 27 is welded to the second connecting rod 26. One end of the first connecting rod 24 near the driving plate 21 is rotatably connected with the joint connecting column 16 of the first truss spray pipe 22, the other end of the first connecting rod 24 is rotatably connected to one end of the second connecting rod 26, and the other end of the second connecting rod 26 is welded to the third truss spray pipe 27. The long linear joint 19 on one end of the swinging rod 30 is rotatably connected to the joint connecting column 16 of the truss supporting frame 14 on the cart body, and the short linear joint 19 on the other end of the swinging rod 30 is rotatably connected to the joint connecting column 16 on the lower section of the second truss spray pipe 25. The second hydraulic cylinder 20 is fixedly mounted on the joint connecting column 16 on the upper section of the first truss spray pipe 22, and the push rod of the second hydraulic cylinder 20 is rotatably connected to one end of the driving plate 21. The other end of the driving plate 21 is rotatably connected with the joint connecting column 16 on the lower section of the first connecting rod 24, and the driving plate 21 is rotated by the movement of hydraulic push rod, thereby driving the entire folding truss structure to move.

Figure 8:
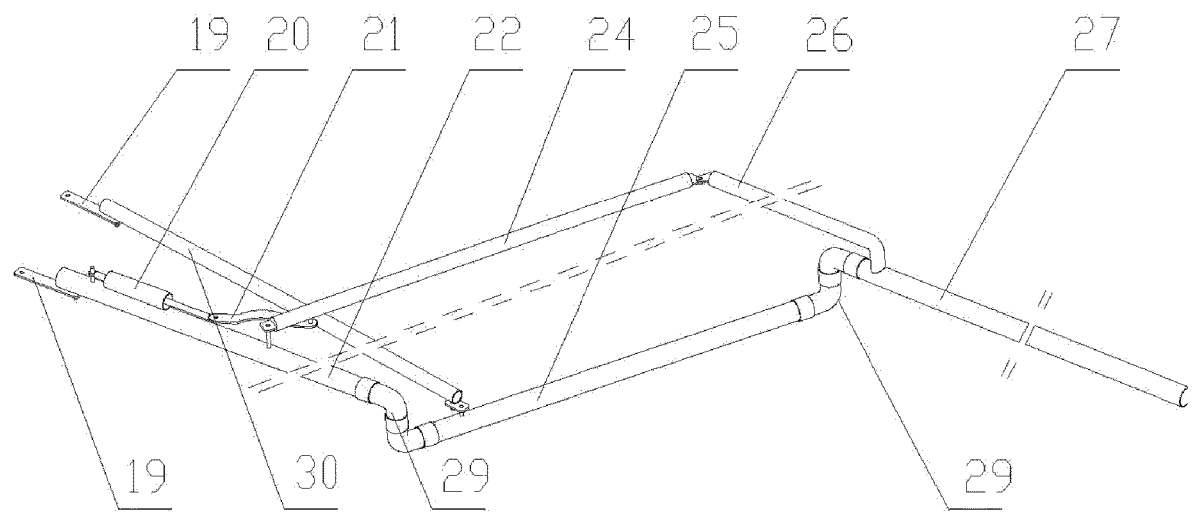
FIG. 8 is an isometric view of the folding truss subassembly in rotary joint type according to the present invention.
Figure 9:
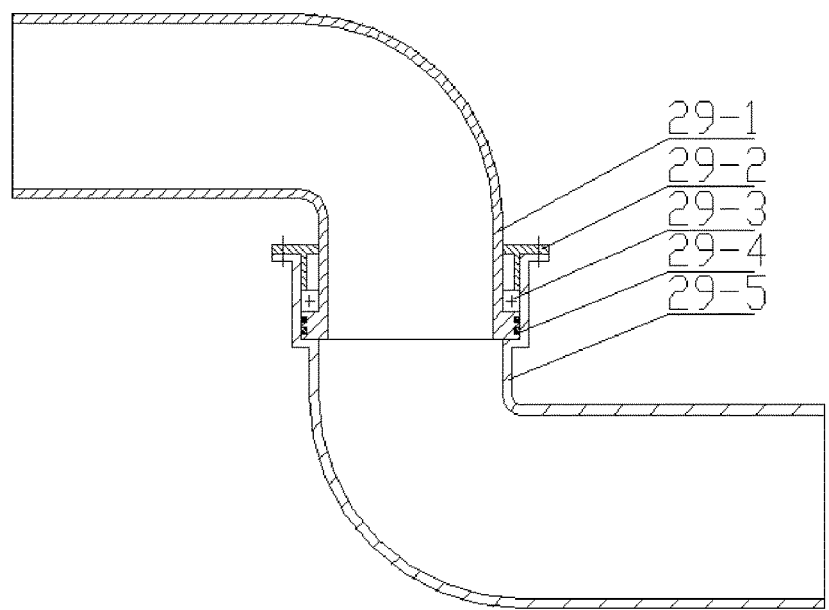
FIG. 9 is a cross-sectional view of the rotary joint according to the present invention.

As shown in FIG. 8, two rotary joints 29 can be used to replace the T-joint 23 and the hose joint 28 between the first truss spray pipe 22 and the second truss spray pipe 25 as well as the T-joint 23 and the hose joint 28 between the second truss spray pipe 25 and the third truss spray pipe 27 for connection, the function of water passing, rotating and folding can also be achieved by the rotary joint. As shown in FIG. 9, the rotary joint 29 comprises an upper rotary head with 90° elbow 29-1, a bearing end cover 29-2, a bearing 29-3, an O-shape sealing ring 29-4 and a lower rotary head with 90° elbow 29-5. One end of the upper rotary head 29-1 is connected with one end of the lower rotary head 29-5 through the bearing end cover 29-2 and the bearing 29-3, and the O-shape sealing ring 29-4 is provided at the connection.

Each of the folding truss assemblies in this embodiment is corresponding to two inhaul-cable structures, and the inhaul-cable structure comprises an inhaul-cable 5, an inhaul-cable drum 33, a scroll spring 32, and a drum bearing 34. Two inhaul-cable structures are arranged between the first and third beams of the chassis 17 to form the first set of inhaul-cable structure, and as shown in FIGS. 2 and 8, the inhaul-cable structure is arranged between the third beam and the fourth beam of the chassis 17 to form the second set of inhaul-cable structure. Each set of inhaul-cable structures provides two symmetrical inhaul-cables on the left and right sides for the folding truss structure, and the inhaul-cables symmetrically pull at the same position of the left and right folding truss structures. The inhaul-cable drum 33 is mounted in the middle of the drum shaft, one end of the scroll spring 32 is mounted on one side of the drum shaft, and the other end thereof is connected to the chassis 17. The drum shaft is mounted between the two beams of the chassis 17 by two drum bearings 34, and the inhaul-cable 5 is wound around the inhaul-cable drum 33. In this embodiment, two inhaul-cables of the first set of inhaul-cable structure are connected to the second truss spray pipes 25 in the left and right sides through the inhaul-cable clamping structure and the inhaul-cable supporting frame 15, and two inhaul-cables of the second set of inhaul-cable structure are connected to the third truss spray pipes 27 in the left and right sides through the inhaul-cable clamping mechanism and the inhaul-cable supporting frame 15.

Figure 11:
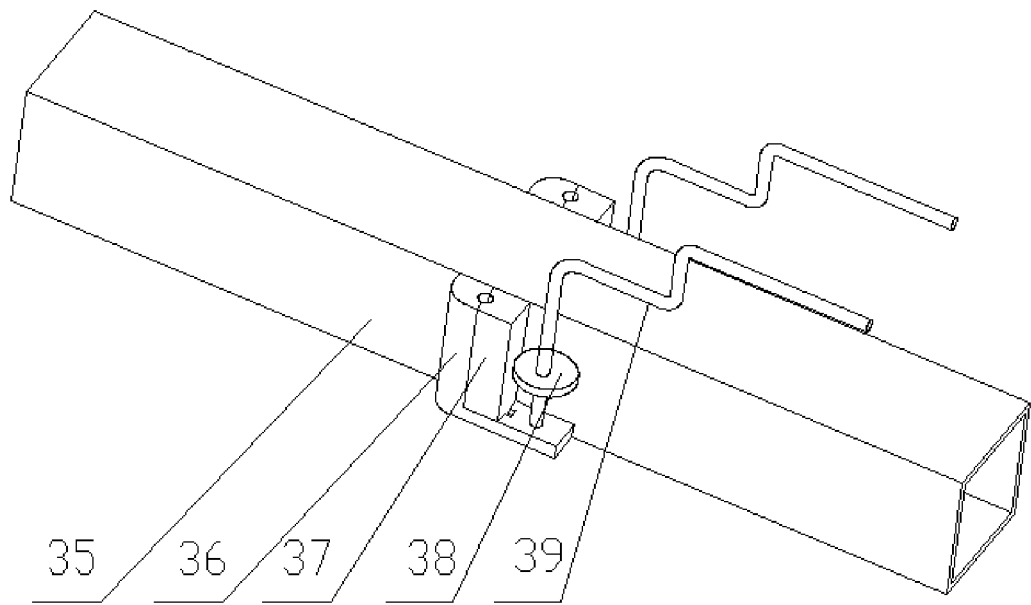
FIG. 11 is an isometric view of the inhaul-cable clamping structure according to the present invention.
Figure 12:
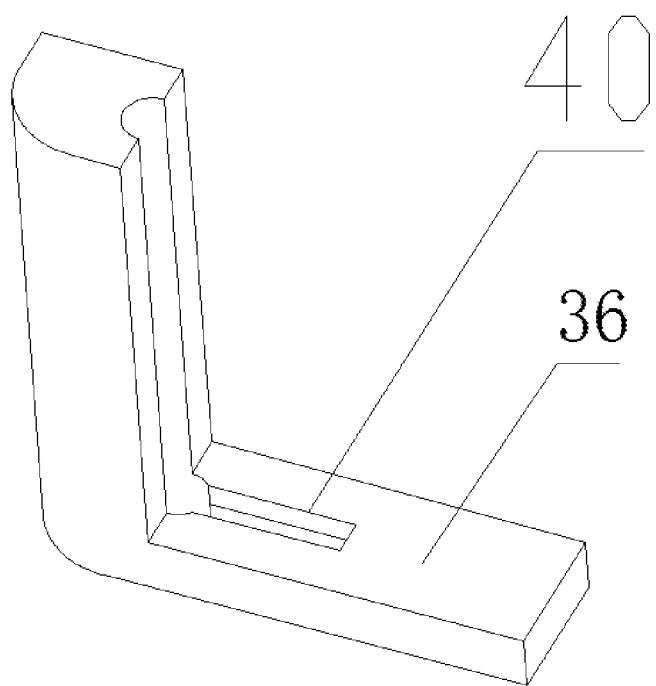
FIG. 12 is a structural schematic view of the fixed clamp block according to the present invention.
Figure 13:
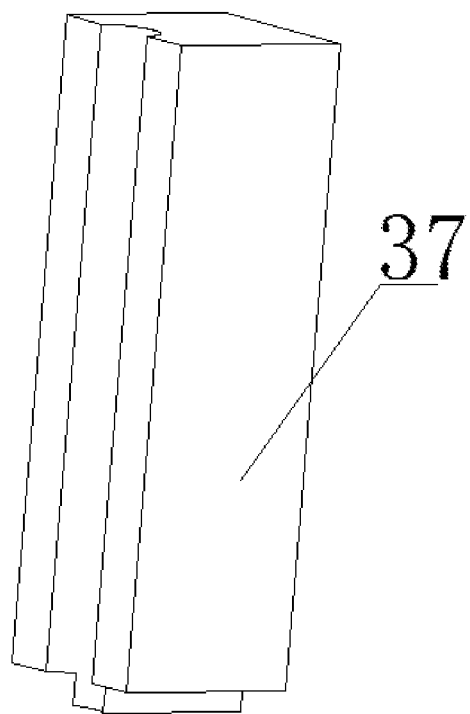
FIG. 13 is a structural schematic view of the sliding clamp block according to the present invention.

As shown in FIGS. 2 and 9, the inhaul-cable clamping structure is mounted on a mounting beam 35, one of the mounting beams 35 is mounted on the upper middle of the first beam and the second beam, and the other is mounted in the upper middle of the second beam and the fourth beam. The inhaul-cable clamping structure comprises a fixed clamp block 36, a sliding clamp block 37, a clamping cam 38 and a cam handle 39. As shown in FIGS. 11-13, the fixed clamp block 36 is mounted on the mounting beam 35, the sliding clamp block 37 is mounted in the sliding groove 40 of the fixed clamp block 36, a through-hole is formed between the sliding clamp block 37 and the fixed clamp block 36, and the inhaul-cable 5 passes through the through-hole. The clamping cam 38 is coaxially fixed to the cam handle 39, the cam handle 39 is rotatably connected to the fixed clamp block 36, and the rotation of the cam handle 39 drives the clamping cam 38 to move, thereby pushing the sliding clamp block 37 to clamp or release the inhaul-cable 5.

Figure 7:
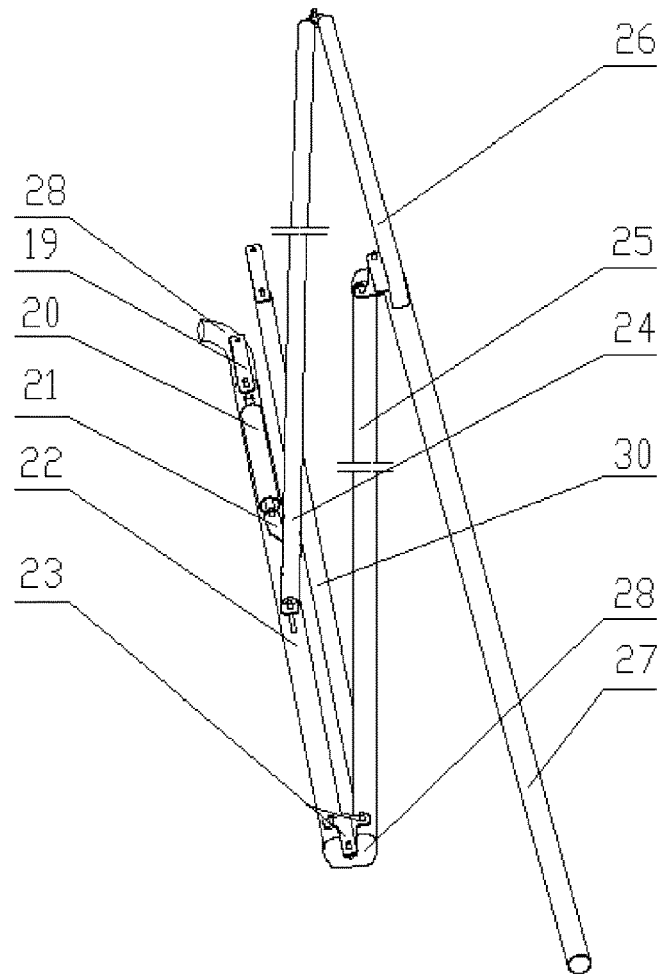
FIG. 7 is a completely folded view of the hose-connected folding truss subassembly according to the present invention.

Working principle flow: before the sprinkling operation, the folding truss structure 4 is in a completely folded state, as shown in FIG. 7. The cam handle 39 of the inhaul-cable clamping structure is in a clamped state at this time. During the sprinkling operation, the sprinkler cart of hose reel irrigator in folding truss inhaul-cable type is hauled by the agricultural trailer to the field to be irrigated, so that the body of the sprinkler cart is in the traveling lane to prevent the crops from being crushed when the sprinkler cart automatically goes back. According to the height of the crop, the height of the truss supporting frame 14 is adjusted to change the sprinkling height of the folding truss structure 4 to adapt to the height of the crop. When the height of the folding truss structure 4 is changed, the height of the center of gravity of the entire sprinkler cart is changed, the mounting positions of the pin holes of the horizontal rod of the rear wheel 18 and the second beam of the chassis 17 are also changed at this time, and then the wheelspan of the left and right rear wheels 18 is changed to make the sprinkler cart travel more stably. The second hydraulic cylinder 20 is activated by releasing the cam handle 39, wherein the hydraulic push rod, the driving plate 21, and the first connecting rod 24 form a slider crank mechanism; wherein the first truss spray pipe 22, the second truss spray pipe 25, the first connecting rod 24, the second connecting rod 26 and the third truss spray pipe 27 form a parallelogram mechanism, the second connecting rod 26 is welded integrally with the third truss spray pipe 27; wherein the first truss spray pipe 22, the second truss spray pipe 25, the swinging rod 30 and the support form a four-rod linkage mechanism. The push rod of the hydraulic cylinder slides outward to push the driving plate 21 to rotate, and drive the first connecting rod 24 to rotate around the joint connecting column of the first truss spray pipe 22. The first connecting rod 24 and the second connecting rod 26 move simultaneously with the third truss spray pipe 27 and the second truss spray pipe 25, and the swinging rod 30 moves simultaneously with the first truss spray pipe 22 under the rotation of the second truss spray pipe 25, as shown in FIG. 3-6.

Figure 10:
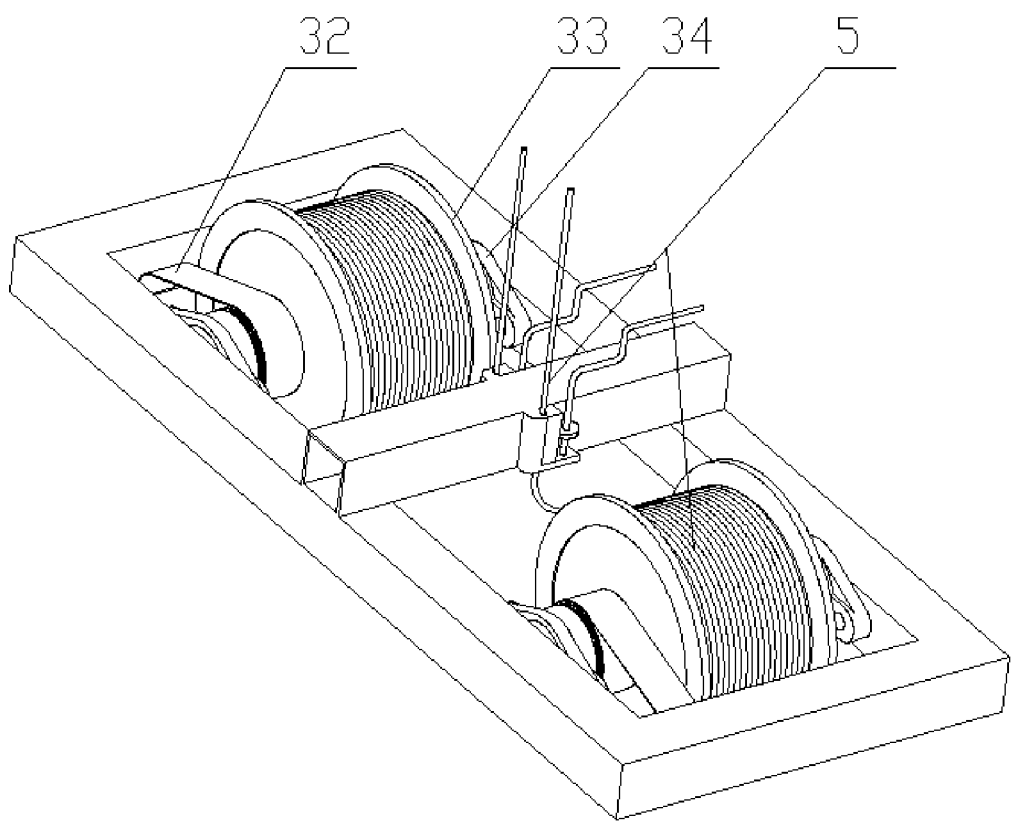
FIG. 10 is a connection view of the inhaul-cable structure and the clamping structure according to the present invention.

When the hydraulic push rod slides to the maximum stroke, the first truss spray pipe 22, the second truss spray pipe 25, and the third truss spray pipe 27 are in a fully extended state, as shown in FIG. 1. During the extension of the truss spray pipe, the inhaul-cable 5 on the second truss spray pipe 25 and the third truss spray pipe 27 is pulled outward. The inhaul-cable drum 33 rotates to release the inhaul-cable 5, the rotation of the inhaul-cable drum 33 is transmitted by the drum shaft to tighten the scroll spring 32, so that the elastic potential energy is stored, the tension of the inhaul-cable is achieved, and the gravity of the folding truss structure 4 received by the inhaul-cable 5 is overcome by the torsional force of the scroll spring 32. When the stroke of hydraulic push rod ends, the second hydraulic cylinder 20 is closed, and the inhaul-cable clamping handle 39 is clamped, and as shown in FIG. 10, the sprinkling operation can be started.

When the sprinkling is finished, the cam handle 39 is released, the second hydraulic cylinder 20 is activated, the hydraulic push rod is moved back to drive the folding truss structure 4 to be folded, and the inhaul-cable 5 is tightened under the pulling of the tightened scroll spring 32. When the hydraulic push rod moves to the maximum position of the return stroke, the second hydraulic cylinder 20 is closed, the cam handle 39 is clamped, the sprinkling operation is finished, and the sprinkler cart is recovered and placed on the reel main engine.

The pressure water of the PE pipe of the hose reel irrigator is supplied to the PE connecting pipe 7, then passes through the connection hose 8, the vertical water pipe 11 and the retractable water pipe 12 into the main connection spray pipe 13. The water entering into the main connecting spray pipe 13 flows into the first truss spray pipe 22, the second truss spray pipe 25, the third truss spray pipe 27 of the right and left folding truss structure 4 through the hose joint 28, then flows into the hose joint 28 or the rotary joint 29 among the first truss spray pipe 22, the second truss spray pipe 25 and the third truss spray pipe 27, and further flows into the nozzle 31 of each truss spray pipe.

The embodiment is a preferred embodiment of the present invention, but the present invention is not limited thereto. Any obvious modifications, replacements or variations that can be made by the persons skilled in the art without departing from the essential contents of the present invention are intended to be within the protection scope of the present invention.

The invention claimed is:

1. A sprinkler cart of hose reel irrigator in folding truss inhaul-cable where in it comprises a cart body, a water supply pipeline, a folding truss structure and an inhaul-cable structure;

the cart body includes a chassis, an inhaul-cable supporting frame and a truss supporting frame, the inhaul-cable supporting frame comprises a lateral connecting rod and vertical supporting rods; the tops of the two supporting rods are respectively connected to the two ends of the connecting rod, and the bottoms thereof are fixed to the chassis; the bottom of the chassis is provided with a travelling wheel, and both ends of the truss supporting frame are slidably connected with two supporting rods, and the position of the truss supporting frame can be adjusted up and down;

the folding truss structure comprises two folding truss subassemblies of the same structure, and the two folding truss subassemblies are symmetrically distributed on both sides of the inhaul-cable supporting frame;

the folding truss subassembly includes a first truss spray pipe having an axial direction along its length, a second truss spray pipe, a third truss spray pipe, a swinging rod, a first connecting rod, a second connecting rod, a driving plate, a second hydraulic cylinder, and hose joints; the first truss spray pipe, the second truss spray pipe and the third truss spray pipe are connected in turn and rotatable relative to each other; the first truss spray pipe, the second truss spray pipe, and the third truss spray pipe are evenly mounted with nozzles; the second hydraulic cylinder is mounted on the first truss spray pipe and arranged along the axial direction of the first truss spray pipe; the end of the piston rod of the second hydraulic cylinder is hinged with one end of the driving plate, and the other end of the driving plate is hinged with the first connecting rod; one end of the first connecting rod near the driving plate is hinged to the first truss spray pipe, the other end thereof is hinged to one end of the second connecting rod, and the other end of the second connecting rod is welded with the third truss spray pipe, the other end of the first truss spray pipe is communicated with a water supply pipeline provided on the cart body and is connected by a hinge device; one end of the swinging rod is connected to the truss supporting frame by a hinge device, and the other end thereof is connected to the second truss spray pipe by a hinge device;

each of the folding truss subassemblies is corresponding to multiple inhaul-cable structures, the inhaul-cable structure comprises an inhaul-cable, the inhaul-cable is connected to the folding truss subassembly through the inhaul-cable supporting frame, and the inhaul-cables on the two folding truss subassemblies are symmetric about the inhaul-cable supporting frame.

2. The sprinkler cart of hose reel irrigator in folding truss inhaul-cable type according to claim 1, where in one end of the first truss spray pipe is communicated with one end of the second truss spray pipe through a hose joint and is connected by a hinge device; the other end of the second truss spray pipe is communicated with one end of the third truss spray pipe through a hose joint and is connected by a hinge device.

3. The sprinkler cart of hose reel irrigator in folding truss inhaul-cable type according to claim 1, where in one end of the first truss spray pipe is connected to one end of the second truss spray pipe through a rotary joint, and the other end of the second truss spray pipe is connected to one end of the third truss spray pipe through a rotary joint; the rotary joint comprises an upper rotary head with 90° elbow, a bearing end cover, a bearing, an O-shape sealing ring and a lower rotary head with 90° elbow; one end of the upper rotary head is connected with one end of the lower rotary head through the bearing end cover and the bearing, and the O-shape sealing ring is provided at the connection.

4. The sprinkler cart of hose reel irrigator in folding truss inhaul-cable type according to claim 1, where in the chassis has a rectangular structure with opposite first beam and second beam, and the PE connecting pipe is vertically mounted at the bottom of the first beam; the traveling wheel comprises a front wheel and two rear wheels, the front wheel is rotatably mounted on the front end of the PE connecting pipe, and the two rear wheels are respectively mounted on both ends of the second beam by vertical rods and horizontal rods; the rear wheel is rotatably mounted on the bottom of the vertical rod, and the top end of the vertical rod is fixed with the horizontal rod; the horizontal rod is sleeved on the end of the second beam of the chassis, the ends of the horizontal rod and the second beam are provided with corresponding pin holes, and the relative position of the horizontal rod and the second beam is set by pin and pin hole.

5. The sprinkler cart of hose reel irrigator in folding truss inhaul-cable type according to claim 4, where in the water supply pipeline comprises a connecting hose, a flange connecting frame, a vertical water pipe, a retractable water pipe, and a main connecting spray pipe; one end of the connecting hose is connected with the rear end of the PE connecting pipe, the other end thereof is connected with the bottom end of the vertical water pipe; the top end of the vertical water pipe is connected with the bottom end of the retractable water pipe, and the top end of the retractable water pipe is communicated with the middle section of the main connecting spray pipe; the main connecting spray pipe is fixed on the truss supporting frame, and both ends of the main connecting spray pipe are respectively connected with the other ends of the two first truss spray pipes, and the vertical water pipe is mounted on the chassis.

6. The sprinkler cart of hose reel irrigator in folding truss inhaul-cable type according to claim 1, where in it further comprises a first hydraulic cylinder, the first hydraulic cylinder is vertically arranged below the truss supporting frame, and the piston rod of the first hydraulic cylinder is fixed to the truss supporting frame.

7. The sprinkler cart of hose reel irrigator in folding truss inhaul-cable type according to claim 5, where in the chassis is provided with a third beam and a fourth beam; a flange is welded in the middle of the vertical water pipe and in flanged connection with the flange connecting frame by a bolt, the flange connecting frame is mounted on the third lateral supporting beam of the chassis.

8. The sprinkler cart of hose reel irrigator in folding truss inhaul-cable type according to claim 7, where in the inhaul-cable structure further comprises an inhaul-cable drum, a scroll spring, drum bearings and an inhaul-cable clamping structure; the inhaul-cable drum is mounted on the middle of the drum shaft, one end of the scroll spring is mounted on one side of the drum shaft, and the other end thereof is connected to the chassis; the drum shaft is mounted between the two beams of the chassis by two drum bearings, and the inhaul-cable is wound around the inhaul-cable drum, and one end of the inhaul-cable is connected to the folding truss subassembly through the inhaul-cable clamping structure.

9. The sprinkler cart of hose reel irrigator in folding truss inhaul-cable type according to claim 8, where in the inhaul-cable clamping structure is mounted on a mounting beam, and the mounting beam is mounted on the upper middle of the first beam and the second beam of the chassis; the inhaul-cable clamping structure comprises a fixed clamp block, a sliding clamp block, a clamping cam and a clamping handle; the fixed clamp block is mounted on the mounting beam, the sliding clamp block is mounted on a sliding groove of the fixed clamp block, a through-hole is formed between the sliding clamp block and the fixed clamp block, and the inhaul-cable passes through the through-hole; the clamping cam is coaxially fixed to the cam handle, the cam handle is rotatably connected to the fixed clamp block, and the rotation of the cam handle drives the clamping cam to move, thereby pushing the sliding clamp block to clamp or release the inhaul-cable.

10. The sprinkler cart of hose reel irrigator in folding truss inhaul-cable type according to claim 1, where in each of the folding truss subassemblies corresponds to two inhaul-cable structures; one end of the transverse connecting rod of the inhaul-cable supporting frame is respectively connected to the second truss spray pipe on both sides by two symmetrical inhaul-cables, and the other end of the transverse connecting rod of the inhaul-cable supporting frame is connected to the third truss spray pipe on both sides by two symmetrical inhaul-cables respectively.

* * * * *